(12) United States Patent
Riviere

(10) Patent No.: US 9,999,933 B2
(45) Date of Patent: Jun. 19, 2018

(54) DOUBLE-SIDED HIGH FEED MILLING INSERT, HIGH FEED MILLING TOOL AND METHOD

(71) Applicant: SECO TOOLS AB, Fagersta (SE)

(72) Inventor: Bertrand Riviere, Bourges (FR)

(73) Assignee: SECO TOOLS AB, Fagersta (SE)

( * ) Notice: Subject to any disclaimer, the term of this patent is extended or adjusted under 35 U.S.C. 154(b) by 0 days. days.

(21) Appl. No.: 15/552,033

(22) PCT Filed: Feb. 4, 2016

(86) PCT No.: PCT/EP2016/052339
§ 371 (c)(1),
(2) Date: Aug. 18, 2017

(87) PCT Pub. No.: WO2016/131661
PCT Pub. Date: Aug. 25, 2016

(65) Prior Publication Data
US 2018/0065195 A1    Mar. 8, 2018

(30) Foreign Application Priority Data

Feb. 20, 2015 (EP) .................................... 15155979

(51) Int. Cl.
*B23C 5/20* (2006.01)
(52) U.S. Cl.
CPC ...... *B23C 5/207* (2013.01); *B23C 2200/0411* (2013.01); *B23C 2200/0483* (2013.01); *B23C 2200/203* (2013.01); *B23C 2200/208* (2013.01); *B23C 2200/243* (2013.01); *B23C 2250/12* (2013.01)

(58) Field of Classification Search
CPC ..... B23C 2200/0411; B23C 2200/0483; B23C 2200/203; B23C 2200/208; B23C 5/207
See application file for complete search history.

(56) References Cited

U.S. PATENT DOCUMENTS

2009/0290945 A1    11/2009  Carl
2010/0202839 A1*   8/2010   Fang .................... B23C 5/109
                                                            407/53

FOREIGN PATENT DOCUMENTS

| EP | 2703108 A1 | 3/2014 |
| EP | 2818269 A1 | 12/2014 |
| WO | 2008120186 A1 | 10/2008 |
| WO | 2015104703 A1 | 7/2015 |

* cited by examiner

*Primary Examiner* — Alan Snyder
(74) *Attorney, Agent, or Firm* — Corinne R. Gorski

(57) ABSTRACT

A double-sided milling insert for high feed milling of metal workpieces includes upper and lower faces facing in opposite directions and convex clearance surfaces extending between the upper and lower faces. Each one of the faces includes a recessed support surface. The support surfaces are substantially parallel to each other and have a cavity therein for receiving a fastening device. Intersections of the convex clearance surfaces with the upper and lower faces form convex cutting edges when seen in a plan view. A rake face is provided adjacent the convex cutting edges. Each convex cutting edge is concave when seen in a side view and includes a substantially straight cutting edge portion on each side of a curved cutting edge portion when seen in plan view. A milling tool with a plurality of such inserts and a method of high feed milling using this tool are also disclosed.

15 Claims, 5 Drawing Sheets

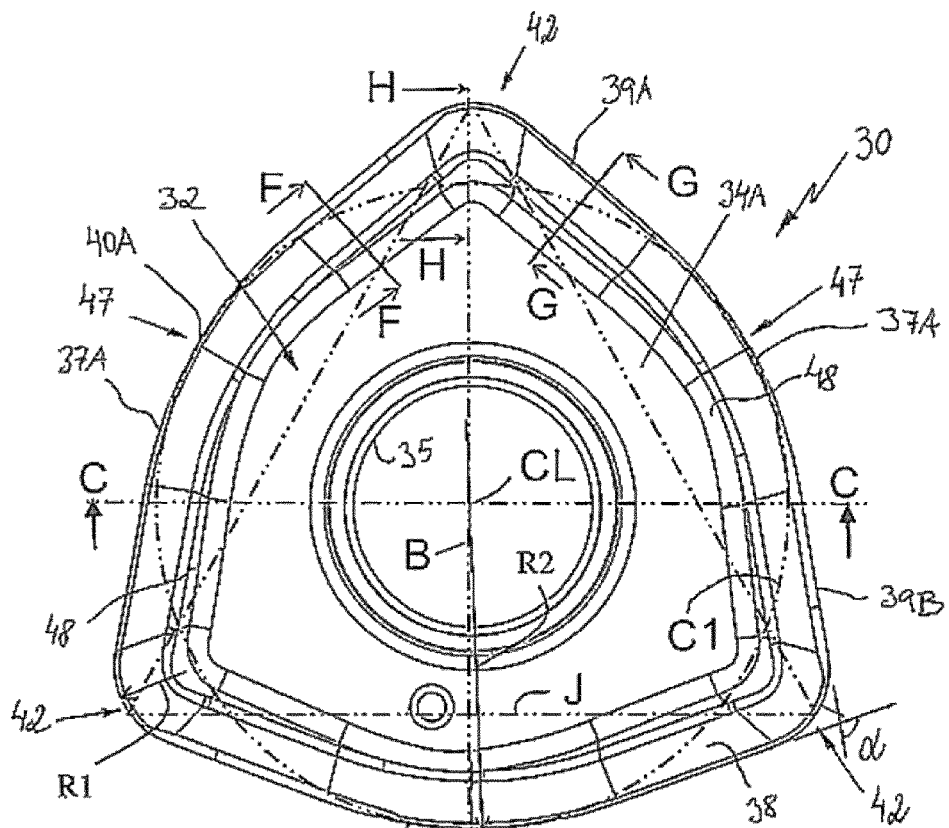
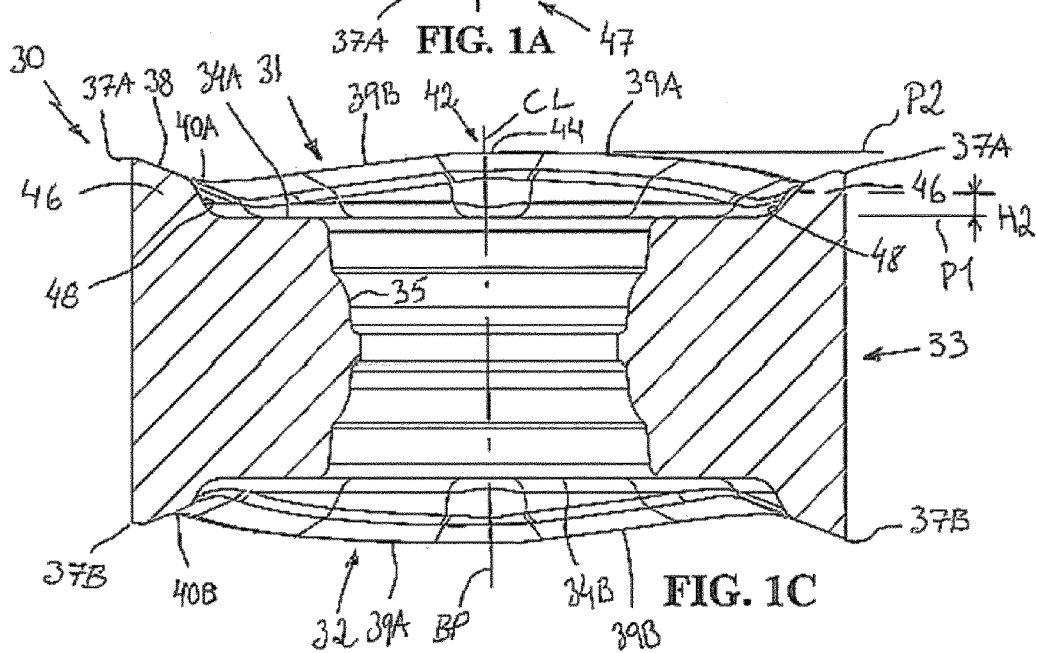

DOUBLE-SIDED HIGH FEED MILLING INSERT, HIGH FEED MILLING TOOL AND METHOD

RELATED APPLICATION DATA

This application is a § 371 National Stage Application of PCT International Application No. PCT/EP2016/052339 filed Feb. 4, 2016 claiming priority of EP 15155979.6 filed Feb. 20, 2015.

BACKGROUND AND SUMMARY

The present invention generally relates to double-sided milling inserts, and more particularly to a double-sided milling insert suitable for use in a high feed milling holder forming a high feed milling tool and a method of high feed milling.

In milling operations, a method of cutting a workpiece by increasing i.a. feed rate (feed distance per tooth) of a milling tool is called high feed milling. High feed milling is a milling method that permits faster machining than other milling methods. It pairs shallow depth of cut, such as 2 mm or less, with high feed per tooth or cutting edge which gives higher metal removal rates, resulting in more parts being machined. Cutting forces are directed along the axis of the machine spindle which means greater stability and reduced vibrations, thereby extending tool life. The method takes advantage of small setting angles. This gives minimal radial cutting forces and maximum axial cutting forces, which stabilizes machining and reduces the risk for vibrations. In turn, this allows raised parameters for cutting even when machining with a large overhang.

The milling tool mounted on the milling machine conventionally comprises several milling inserts mounted at the periphery of the milling tool so that each active cutting edge is oriented substantially radially in the milling tool.

Trigon style cutting inserts are frequently used with cutting edges designed with big radii, especially in vertical or plunging operations trigon style inserts offer good chip evacuation. Cutting inserts used have a substantially triangular profile, each intended to be positioned substantially in a plane of the axis of rotation of the milling cutter body. It is common to provide a straight cutting edge in contact with the surface to be machined. However, the arrangement of such a cutting edge may require more power during machining and lead to tolerance sensitivity, vibrations and/or impaired chip removal rate.

EP 2703108 A1 discloses a milling tool having trigonal milling insert mounted therein.

Changes in the configuration of the cutting insert have been proposed so as to have angled clearance surfaces to allow for an optimized orientation of the cutting edge of the cutting insert mounted in the milling cutter body and relative to the material surface to be machined. However, even if such geometries may allow an improved function of the cutting operation, the production of these cutting inserts requires complex steps of pressing and machining that generate costs and production times can be extended.

The present invention is intended to overcome these drawbacks by proposing a high feed milling insert and a high feed milling tool adapted to be easily produced at a relatively low cost while maintaining the quality of cutting.

It is desirable to provide a double-sided milling insert that can be mounted on a toolholder at a favorable radial angle. It is further desirable to provide an insert that can be well supported by the toolholder.

It is desirable to provide a double-sided milling insert and a high feed milling tool which provide improved performance and which are suited for applications in which commonly round-shaped cutting inserts are used and high-feed surface finishing applications.

In accordance with an aspect of the invention, a double-sided milling insert for high feed milling of metal workpieces wherein the insert has a trigonal basic shape and comprises upper and lower faces facing in opposite directions and convex clearance surfaces extending between the upper and lower faces, each one of the faces comprising a recessed support surface, said support surface being substantially parallel to the other support surface, and having a cavity therein for receiving a fastening means, intersections of the convex clearance surfaces with the upper and lower faces forming convex cutting edges when seen in a plan view, a rake face being provided adjacent the convex cutting edges, wherein each convex cutting edge is concave when seen in a side view, each convex cutting edge comprises a substantially straight cutting edge portion on each side of a curved cutting edge portion when seen in a plan view. Each cutting edge has a first straight cutting edge portion and a second straight cutting edge portion on each side of the curved portion, wherein the first straight cutting edge portion and the second straight cutting edge portion each follows a straight or convex path in a side view and are both straight in a plan view. The curved portion has a length that is longer than the length of anyone of the straight cutting edge portions. The curved cutting edge portion facilitates formation of a curved wiper edge to achieve fine surface finish in the metallic workpiece and facilitates determination of the setting angle.

In accordance with another aspect of the invention, adjacent clearance surfaces meet at a first corner defining a bisector, wherein said clearance surfaces form an obtuse corner angle. A tangent to a convex cutting edge forms an internal acute angle with a plane containing the clearance surface at the corner when seen in a side view. The clearance surface comprises a substantially planar portion at each side of a central curved portion of the clearance surface making tool holder pocket easier to manufacture.

In accordance with another aspect of the invention, each convex clearance surface comprises a waist in the area of the central curved portion when seen in a side view, which is advantageous for reducing power requirements.

In accordance with another aspect of the invention, the obtuse corner angle is in the range of 95 to 120° which is advantageous for strength and for copy milling.

In accordance with another aspect of the invention, the bisector lies in a bisector plane which intersects the waist which is advantageous for maximizing the support surface area on the insert.

In accordance with another aspect of the invention, the bisector plane intersects a center or center line of the cavity which is advantageous for achieving a symmetrical insert.

In accordance with another aspect of the invention, lowest points of curved portions of the cutting edges are located at opposite sides of the bisector plane which is advantageous for reducing power requirements.

In accordance with another aspect of the invention, each convex clearance surface is perpendicular to a plane parallel to a recessed support surface thereby providing durable negative basic insert geometry.

In accordance with another aspect of the invention, the convex cutting edge is substantially V-shaped when seen in a side view, wherein a line intersecting the lowest point of the convex cutting edge and a highest point of the corner forms an angle with a plane P1 that is in the range of 5 to 15°. A V-shaped cutting edge brings a relatively smooth cut entry at milling.

In accordance with another aspect of the invention, a rake face is directly or indirectly connected to the convex cutting edge, wherein the rake face forms a positive rake angle gamma which is an additional measure for reducing power requirements.

In accordance with another aspect of the invention, the rake face is partially connected to the convex cutting edge via a chamfer forming a negative angle with the plane to strengthen the cutting edge.

In accordance with another aspect of the invention, the rake face is located on a circumferential ledge extending above the support surface to distance the support surface from the region of chip flow and thus facilitate chip removal.

In accordance with another aspect of the invention, the rake face extends higher above the support surface at the corners than at the central curved cutting edge portion to avoid disadvantageous material accumulation occurring by so called smear-on.

In accordance with another aspect of the invention a high feed milling tool is disclosed having a longitudinal axis of rotation and comprising a tool body having a plurality of insert pockets formed in a front end of the tool body and a plurality of double-sided milling inserts retained in the plurality of insert pockets, each insert pocket comprising a pocket bottom abutment surface, a threaded hole extending tangentially rearwardly from the pocket bottom abutment surface, pocket side walls extending upwardly from the pocket bottom abutment surface, two of the pocket side walls being pocket abutment surfaces that form a pocket internal obtuse angle with the pocket bottom abutment surface, wherein the pocket bottom abutment surface is raised relative to its closest surrounding, and wherein each side of the pocket bottom abutment surface comprises a substantially straight portion on each side of a central curved portion to provide a correct indexing of the cutting insert. At least one milling insert is mounted in an insert pocket at a setting angle in the range of 5 to 15°.

In accordance with another aspect of the invention a method of high feed milling of a metallic workpiece is disclosed comprising the steps of providing a high feed milling tool of the above-captioned type in a milling machine, arranging milling inserts at a setting angle in the range of 5 to 15°, operating at 800 to 1300 rpm, at up to about 2 mm in depth-of-cut, and at a feed rate of 5 to 10 meters per minute.

BRIEF DESCRIPTION OF THE DRAWINGS

The invention will be better understood from the following description, which relates to a preferred embodiment, given by way of non-limiting example, and explained with reference to the accompanying schematic drawings, in which:

FIG. 1A shows a double-sided high feed milling insert according to the invention in a plan view;

FIG. 1C shows the insert in crossection along line C-C in FIG. 1A;

DETAILED DESCRIPTION

Figure 1B:
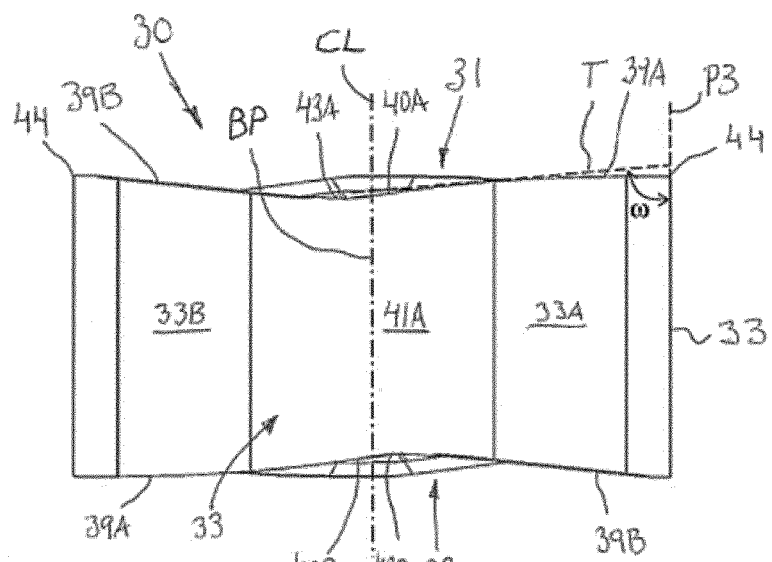
FIG. 1B shows the insert in a side view.
Figure 1D:
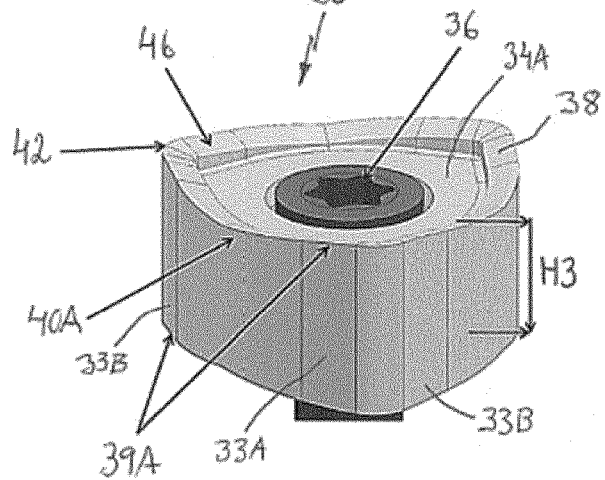
FIG. 1D shows the insert and a fastening means in a perspective view.

The high feed milling insert 30 shown in FIGS. 1A-1H has a trigonal basic shape. The insert is substantially triangular; each side of the triangle is broken outward from the center of the triangle in order to form two sides of each side of the triangle. Thus the insert has obtained six corners, wherein the tip angles of the triangle having been made more obtuse. Another way of describing a trigon-shaped milling insert is that an imaginary circle inscribed in a midplane of the milling insert may touch the periphery of the milling insert in six points. Such a shape discloses in a plan view as in FIG. 1A three first corners 42 with relatively small radii R1 and three second corners or curved portions 47 with relatively large radii R2. The radius R2 may have its center at the insert center line CL. The first corners 42 comprise nose cutting edges, and each edge is defined by the radius R1. The insert 30 comprises upper 31 and lower 32 faces facing in opposite directions. Convex sides or clearance surfaces 33 extend between the upper 31 and lower 32 faces. The term "convex" may here mean that the clearance surface extends beyond an inscribed triangle J, shown in FIG. 1A, in an at least partly curved manner. The expression "double-sided" here means that both upper 31 and lower 32 faces have usable cutting edges. The high feed milling insert thus have a cutting edge at each of the peripheral edges at the intersection between a clearance surface and upper and lower surfaces, respectively. Such a construction of the high feed milling insert provides six cutting edges possible to index into an active position. An example of an active position is shown to the right in FIG. 2C.

Each one of the faces 31, 32 comprises a recessed support surface 34A, 34B. Each support surface is substantially parallel to the other support surface, and has a cavity 35 therein for receiving a fastening means, such as a screw 36 or clamp. A distance between the recessed support surfaces 34A, 34B is depicted H3 in FIG. 1D. Each support surface is preferably surrounded by a circumferential ledge 46. The circumferential ledge 46 may extend above the associated support surface, such that it forms a distance or height perpendicular to a plane P1, which is parallel to or contains the recessed support surface. The support surface 34A, 34B is recessed relative to a plane P2 touching all three small radii corners 42 and parallel to the plane P1.

Intersections of the convex clearance surfaces 33 with the upper and lower faces form convex cutting edges 37A, 37B when seen in a plan view, as in FIG. 1A. A rake face 38 is provided adjacent the convex cutting edges 37A, 37B. The rake face 38 is preferably endless as it may be continuous along the periphery or perimeter of the insert when seen in plan view. Preferably, the support surface 34A, 34B is recessed relative to all cutting edges 37A, 37B and spaced from the rake face 38 via a slope 48. The slope 48 may have its greatest height at the bisector B and be configured such that its height diminishes the further from the bisector it is measured. The slope 48 may have its smallest height at the corner 47.

The convex curvature of the cutting edge 37A, 37B brings a continuous pressure against the machined during a cutting operation, regardless of the quality of flatness of this surface. This curvature of the cutting edge allows the high feed milling insert to be adapted for working a wide range of surface flatness types.

Adjacent clearance surfaces 33 meet at the first corner 42 and define a bisector B and form an obtuse corner angle α. The obtuse corner angle α is in the range of 95 to 120°. The bisector B lies in a bisector plane BP which may intersect the middle of the clearance surface 33.

The clearance surface 33 may comprise a substantially planar portion 33A, 33B on each side of a central curved portion 41A. Each convex clearance surface comprises a waist 41 in the area of the central curved portion 41A when seen in a side view. A shortest perpendicular distance at the waist 41 is greater than the distance H3.

A tangent T to a convex cutting edge forms an internal acute angle ω with a plane P3 containing the clearance surface at the first corner 42 when seen in a side view (FIG. 1B). The acute angle ω is in the range of 75 to 87°.

The convex cutting edge is substantially V-shaped when seen in a side view, wherein a line (for example parallel to the tangent T) intersecting the lowest point of the convex cutting edge and a highest point of the first corner 42 forms an angle that is in the range of 5 to 15° with the plane P1.

The clearance surface 33 comprises a substantially planar portion 33A, 33B at each side of a central curved portion 41A of the clearance surface. Preferably, the portions 33A, 33B blend into the portion 41A, such as by sharing a common tangent at one point. Said points may define a length of the portion which is longer than the length of anyone of the planar portions 33A, 33B. Stated another way, each cutting edge 37A, 37B has a first straight cutting edge portion 39A and a second straight cutting edge portion 39B on or at each side of the curved portion 40A, 40B, wherein the first straight cutting edge portion 39A and the second straight cutting edge portion 39B each follows a straight or convex path in a side view (FIG. 1B) and are both straight in a plan view (FIG. 1A), and wherein the curved portion 40A, 40B has a length that is longer than the length of anyone of the straight cutting edge portions.

The clearance surface 33 may be configured such that every second clearance surface portion 33A, 33B is planar while the rest is part-cylindrical.

Each convex cutting edge 37A, 37B comprises a substantially straight cutting edge portion 39A, 39B on each side of a curved cutting edge portion 40A, 40B when seen in a plan view.

Each curved cutting edge portion 40A, 40B follows a path in the side view of FIG. 1B which defines a lowest point 43A, 43B, i.e. at the shortest distance from the plane P1 of the associated support surface 34A, 34B respectively. The lowest point 43A, 43B of the cutting edges 37A, 37B associated with the same clearance surface 33 may be located at opposite sides of the bisector plane BP such as to elongate the distance of slope for the cutting edge 39A. The lowest points 43A, 43B may be spaced apart less than two times the radius R1 of the small radii corner 42.

Each curved cutting edge portion 40A, 40B serves to wipe the surface 22 (FIG. 2C) to produce a favorable finish.

Each cutting edge 37A, 37B has a first portion 39A and a second portion 39B on each side of a curved cutting edge portion 40A, 40B. The first portion 39A may follow a straight or convex path in the side view of FIG. 1B. The curved cutting edge portion 40A, 40B can be defined by at least one radius R2, when seen in plan view, which is 5 to 30 times the radius R1. The radius R1 can be 4 to 20 mm. The second portion 39B may follow a straight or convex path in the side view of FIG. 1B. The first portion 39A and the second portion 39B are both straight when seen in plan view according to FIG. 1A and each one may in that capacity also be named a straight portion. The curved portion 40A, 40B may have a length or arc length in plan view that is longer than the length of anyone of the straight portions 39A, 39B, preferably at least two times the length of anyone of the straight portions.

Each convex clearance surface 33 is perpendicular to the plane P1 which is parallel to or contains the recessed support surface 34A, 34B. Such shape makes pressing of a so called green body relatively easy, wherein pressing occurs in only two opposite directions, substantially along one axis. Furthermore, the support surface 34A, 34B can be flat all around the cavity 35 such that picking of the pressed green body is simplified and such that chip obstruction is avoided.

The cutting edge 37A, 37B is convex when seen in a plan view and concave when seen in a side view. The cutting edge 37A, 37B may extend in height direction from the lowest point 43A, 43B thereof to a highest point 44 at the adjacent first corners 42.

Figure 1E:
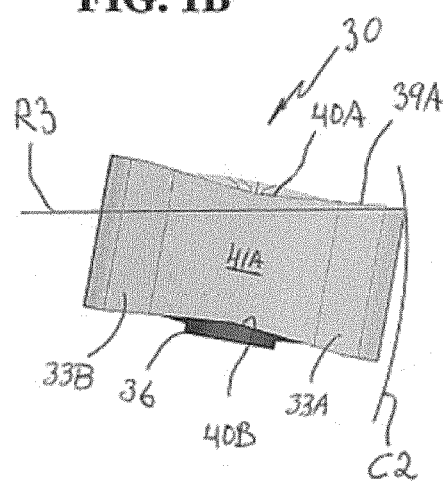
FIG. 1E shows the insert and the fastening means in a side view.
Figure 1F:
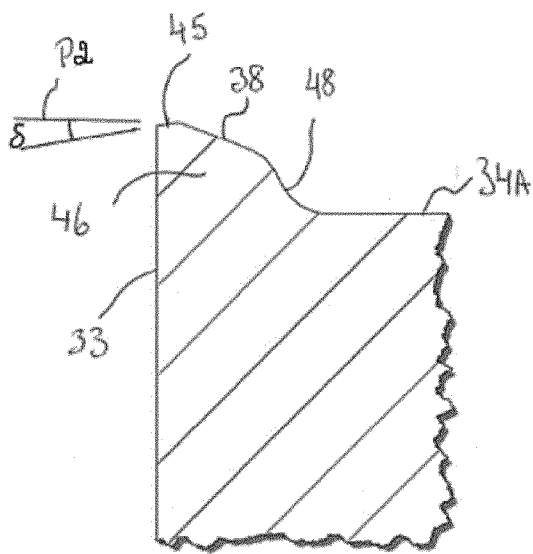
FIG. 1F shows the insert in crossection along line F-F in FIG. 1A.
Figure 1G:
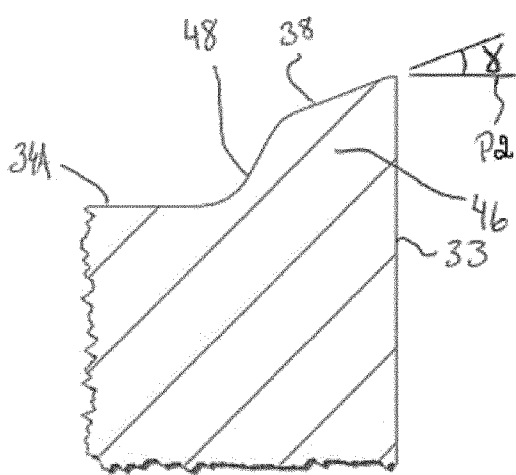
FIG. 1G shows the insert in crossection along line G-G in FIG. 1A.
Figure 1H:
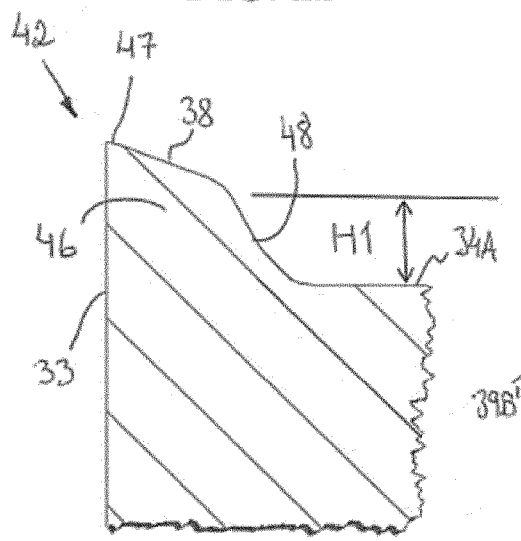
FIG. 1H shows the insert in crossection along line H-H in FIG. 1A.

A rake face 38 is directly or indirectly connected to the convex cutting edge 37A, 37B, wherein the rake face forms a positive rake angle γ (FIG. 1G). The positive rake angle γ makes the tool more sharp and pointed, reduces cutting forces and power requirements, and may avoid the formation of a built-up edge. The rake face 38 may be partially connected to the convex cutting edge 37A, 37B for example via a first chamfer 45 at the straight portion 39B which forms a negative angle δ with the plane P1 (FIG. 1F). The first chamfer 45 strengthens the cutting edge. The rake face 38 may be partially connected to the convex cutting edge 37A, 37B via a second chamfer 47 at the straight portion 39A, which forms a positive angle with the plane P1 for cutting more easily (FIG. 1H).

The rake face 38 is located on the circumferential ledge 46 extending above the support surface 34A, 34B, i.e. at a distance from the ledge in the thickness direction of the insert. The rake face 38 extends higher above the support surface 34A, 34B in the vicinity of the first corners 42 than at the central curved cutting edge portion 40A, 40B. Thus, a distance H1 at the first corners 42 is greater than a distance H2 at the curved portion 40AA, 40B. If, for example, the milling insert is provided with a wear-reducing coating, the latter may be endangered by a material accumulation. If the material accumulation grows excessively large and is entrained by the chips sweeping there over, under certain circumstances damage to the coating may occur. Further, material may accumulate on surface regions which, in a different orientation of an indexable milling insert, will serve as support surfaces. A material accumulation on such surfaces thus results in a faulty positioning which is to be avoided.

FIG. 1E schematically illustrates how the insert 30 may be set relative to a radius R3 normal to a circle C2 made by the milling tool during rotation. The substantially planar cutting edge portion 39A forms a small negative angle (0 to −5°) with the radius R3, but not as large it would have been if the cutting edges 37A, 37B were parallel with the plane P1. Power requirements are thus reduced. In some cases for further reduction also a small positive angle (>0 to +5°) can be used.

Figure 2A:
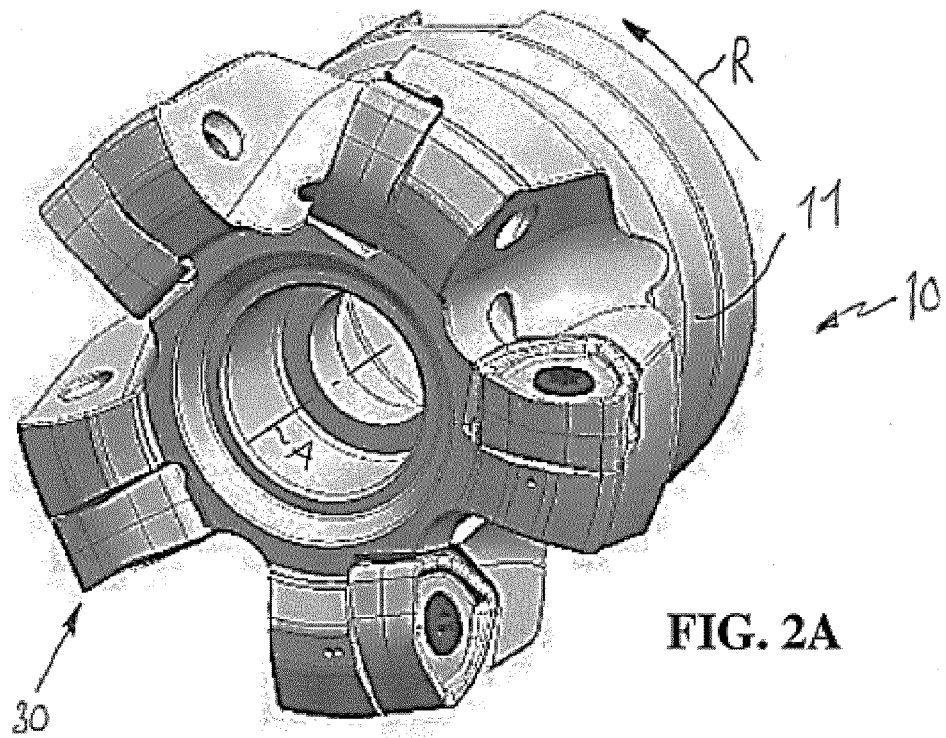
FIG. 2A is a perspective view of a high feed milling tool according to the invention.
Figure 2B:
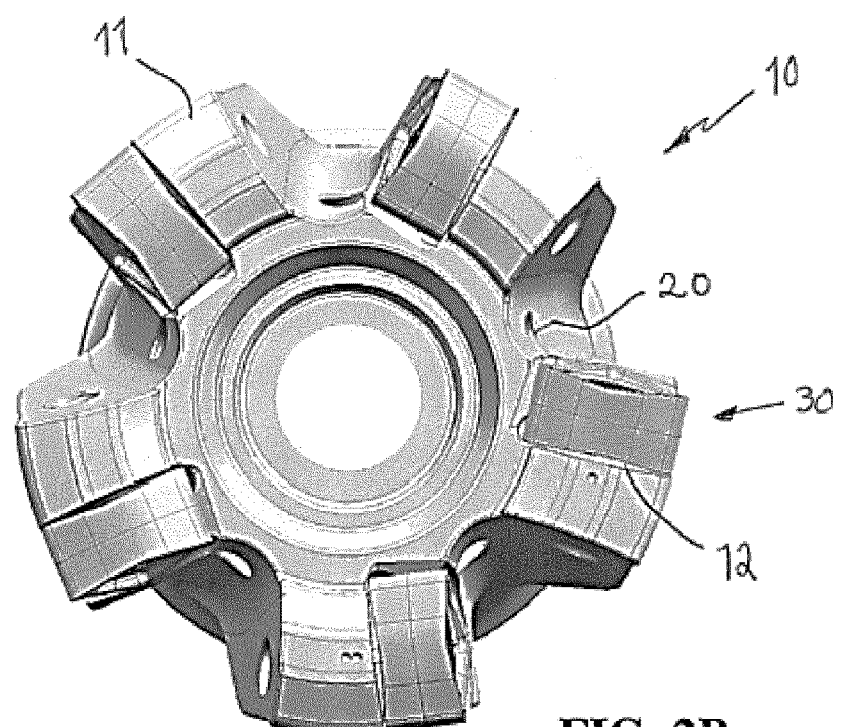
FIG. 2B is a bottom view of the high feed milling tool.
Figure 2C:
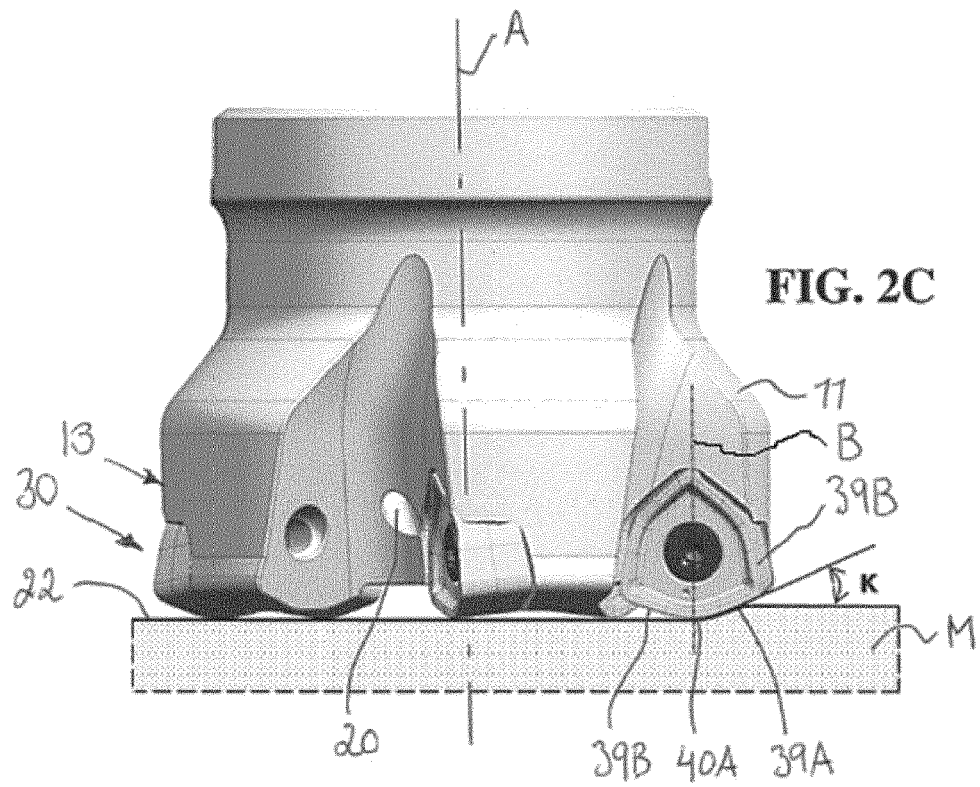
FIG. 2C is a side view of the high feed milling tool.
Figure 2D:
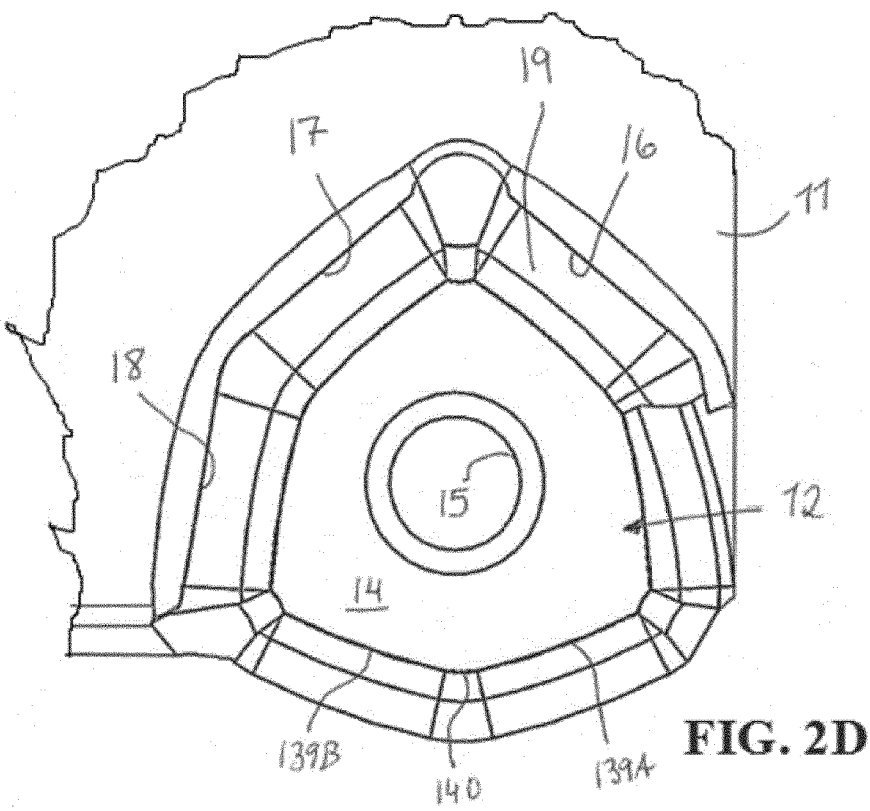
FIG. 2D is a plan view of an insert pocket of the high feed milling tool.

A high feed milling tool 10 for metal workpieces M is shown in FIGS. 2A-2C. The method of using the high-feed milling tool is to operate at 800 to 1300 rpm, at up to about 2 mm, often 0.5 to 1 mm, in depth-of-cut, and a feed rate of 5 to 10 meters per minute. An entering or setting angle κ in the range of 5 to 15° may be used. The setting angle κ is the angle between the active cutting edge portion 39A and a plane normal to the rotational axis A. The convex curvature of the cutting edge 37A, 37B causes a continuous pressure against the machined during a cutting operation, regardless of the quality of flatness of this surface. This curvature of the cutting edge allows the high feed milling insert to be adapted for working a wide range of surface flatness. A bisector B of the insert is positioned substantially parallel to the rotational axis A. It is preferable to keep the tool engaged in the workpiece as much as possible across the circumference of the tool and engage it more than 40 percent of the circumference to keep the milling operation balanced.

For the machining of pockets and the like, it is preferable to use the active cutting edge portion 39B as a ramping cutting edge portion, i.e. the cutting edge portion that is located closer to the axis A than the cutting edge portion 39A, and which blends with the surface wiping cutting edge portion 40A, 40B.

The high feed milling tool comprises a milling tool body 11 having a plurality of insert pockets 12 formed in a front end 13 of the tool body and a plurality of the above-captioned double-sided milling inserts 30 retained in the plurality of insert pockets. In general, the cutting inserts are formed of a material which is harder and more wear resistant as compared to the material of the milling tool body. For example, the cutting inserts are typically made from cemented carbide, cermet or ultra-hard cutting materials, such as PCD or CBN. The number of pockets may vary, wherein there are five available positions for inserts in this case.

Coolant outlets 20 are provided in the toolholder 11, which are generally directed towards the curved and straight portions of the active cutting edge to cool the cutting insert and to reduce the risk for smear-on.

Each insert pocket 12 has a pocket bottom abutment surface 14 of substantially the same shape as the support surface 34A, 34B of the insert 30 although of slightly smaller area, about 80 to 95% smaller. A threaded hole 15 extends tangentially rearwardly from the pocket bottom abutment surface to receive the screw 36. Pocket side walls 16, 17, 18 extend upwardly from the pocket bottom abutment surface 14. The pocket side walls 16 and 17 form a pocket internal obtuse angle identical or corresponding to the angle α of the cutting insert 30. The pocket bottom abutment surface is raised relative to its closest surrounding by the formation of a circumferential groove 19 so that the passive cutting edges facing away from the rotational direction R of the tool remain intact. Each side of the pocket bottom abutment surface comprises a substantially straight portion 139A, 139B on each side of a central curved portion 140.

Figure 3:
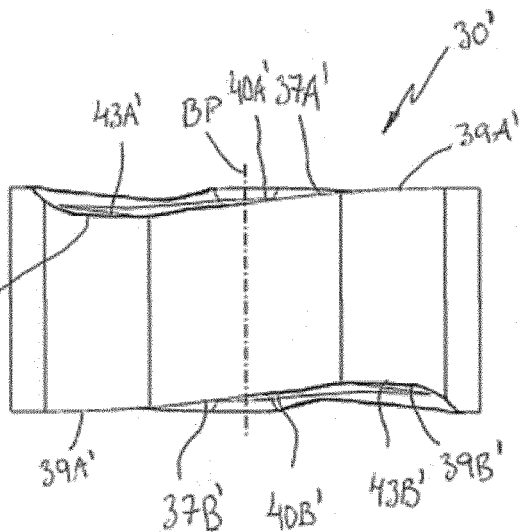
FIG. 3 shows an insert according to an alternative embodiment of the invention in a side view.

FIG. 3 shows a high feed milling insert 30' according to an alternative embodiment of the invention. If seen in plan view the insert 30' would have substantially the same appearance as in FIG. 1A. The high feed milling insert is provided with a cutting edge 37A', 37B' at each of the peripheral edges at the intersection between a clearance surface and upper and lower surfaces, respectively. Such a construction of the high feed milling insert provides six cutting edges possible to index into an active position. The insert 30' differs from the above described insert 30 by having the lowest points 43A', 43B' of the cutting edges spaced wider apart on opposite sides of the bisector plane BP than at the insert 30. The lowest points 43A', 43B' may be spaced apart more than the radius of the small radii corner. The lowest points may even be located at a second portion 39B' on a side of a curved cutting edge portion 40A', 40B'. The axial angle of the second portion 39B' will become less negative when this cutting edge is used for copy milling, e.g. when the tool is moved axially rearwardly while milling.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. The terms in the present text are to be interpreted as perceived by the skilled person. The expression "when seen in plan view" refers to views like FIG. 1A, i.e. a view perpendicular to the upper or lower surfaces, and the expression "when seen in side view" refers to views like FIG. 1B and FIG. 3 i.e. a view perpendicular to the center line CL.

Although the terms "upper face" and "lower face" are used in the present context, it will be apparent to a skilled person that this is for ease of explanation only and that whether an "upper face" is actually on top or not depends on the orientation of the milling insert. In particular, of course the milling insert can be turned upside down such that the "upper face" becomes positioned below the "lower face" and vice versa.

While this invention has been illustrated and described in accordance with a preferred embodiment, it is recognized that variations and changes may be made therein without departing from the invention as set forth in the claims.

The disclosures in EP Patent Application No. 15155979.6, from which this application claims priority, are incorporated herein by reference.

The invention claimed is:

1. A double-sided milling insert for high feed milling of metal workpieces, the insert comprising:
   a trigonal basic shape;
   upper and lower faces facing in opposite directions;
   convex clearance surfaces extending between the upper and lower faces, each one of the faces including a recessed support surface, said support surface being substantially parallel to another support surface, and having a cavity therein for receiving a fastening device;
   intersections between the convex clearance surfaces with the upper and lower faces, the intersections forming convex cutting edges when seen in a plan view; and
   a rake face provided adjacent the convex cutting edges, each convex cutting edge being concave when seen in a side view, and including a substantially straight cutting edge portion on each side of a curved cutting edge portion when seen in a plan view, each cutting edge having a first straight cutting edge portion and a second straight cutting edge portion on each side of the curved portion, wherein the first straight cutting edge portion and the second straight cutting edge portion each follows a straight or convex path in a side view and are both straight in a plan view, and wherein the curved portion has a length that is longer than a length of anyone of the straight cutting edge portions.

2. The double-sided milling insert according to claim 1, wherein adjacent clearance surfaces meet at a first corner defining a bisector, wherein said clearance surfaces form an obtuse corner angle, in that a tangent to a convex cutting edge forms an internal acute angle with a plane containing the clearance surface at the corner when seen in a side view, and wherein the clearance surface has a substantially planar portion on each side of a central curved portion of the clearance surface.

3. The double-sided milling insert according to claim 2, wherein each convex clearance surface includes a waist in an area of the central curved portion when seen in a side view.

4. The double-sided milling insert according to claim 2, wherein the obtuse corner angle is in the range of 95 to 120°.

5. The double-sided milling insert according to claim 3, wherein the bisector lies in a bisector plane which intersects the waist.

6. The double-sided milling insert according to claim 1, wherein a bisector plane intersects a center or center line of the cavity.

7. The double-sided milling insert according to claim 6, wherein lowest points of curved portions of the cutting edges are located at opposite sides of the bisector plane.

8. The double-sided milling insert according to claim 1, wherein each convex clearance surface is perpendicular to a plane which is parallel to or contains a recessed support surface.

9. The double-sided milling insert according to claim 1, wherein each convex cutting edge is substantially V-shaped when seen in a side view, wherein a line intersecting the lowest point of the convex cutting edge and a highest point of the first corner forms an angle with a plane that is in the range of 5 to 15°.

10. The double-sided milling insert according to claim 1, wherein the rake face is directly or indirectly connected to the convex cutting edge, wherein the rake face forms a positive rake angle.

11. The double-sided milling insert according to claim 1, wherein the rake face is partially connected to the convex cutting edge via a chamfer forming a negative angle with the plane.

12. The double-sided milling insert according to claim 1, wherein the rake face is located on a circumferential ledge extending above the support surface.

13. The double-sided milling insert according to claim 12, wherein the rake face extends higher above the support surface at the first corners (42) than at the curved cutting edge portion.

14. A high feed milling tool having a longitudinal axis of rotation and comprising:
   a milling tool body having a plurality of insert pockets formed in a front end of the tool body, each insert pocket including a pocket bottom abutment surface, a threaded hole extending tangentially rearwardly from the pocket bottom abutment surface, pocket side walls extending upwardly from the pocket bottom abutment surface, the pocket side walls and forming a pocket internal obtuse angle, the pocket bottom abutment surface being raised relative to its closest surrounding, and wherein each side of the pocket bottom abutment surface includes a substantially straight portion on each side of a central curved portion; and
   a plurality of double-sided milling inserts retained in the plurality of insert pockets, each of the inserts including upper and lower faces facing in opposite directions, convex clearance surfaces extending between the upper and lower faces, each one of the faces including a recessed support surface, said support surface being substantially parallel to another support surface, and having a cavity therein for receiving a fastening device, intersections between the convex clearance surfaces and the upper and lower faces forming convex cutting edges when seen in a plan view, and a rake face provided adjacent the convex cutting edges, each convex cutting edge being concave when seen in a side view, and including a substantially straight cutting edge portion on each side of a curved cutting edge portion when seen in a plan view, each cutting edge having a first straight cutting edge portion and a second straight cutting edge portion on each side of the curved portion, wherein the first straight cutting edge portion and the second straight cutting edge portion each follows a straight or convex path in a side view and are both straight in a plan view, and wherein the curved portion has a length that is longer than a length of anyone of the straight cutting edge portions, at least one milling insert being mounted in an insert pocket at a setting angle in the range of 5 to 15°.

15. A method of high feed milling of a metallic workpiece comprising the steps of:
   providing a high feed milling tool according to claim 14 in a milling machine;
   arranging the milling inserts in the insert pockets at a setting angle in the range of 5 to 15°; and
   operating the milling machine at 800 to 1300 rpm, at up to about 2 mm in depth-of-cut, and at a feed rate of 5 to 10 meters per minute.

* * * * *